United States Patent [19]
Pamlenyi

[11] 3,743,821
[45] July 3, 1973

[54] DENSITY CALCULATOR

[75] Inventor: George Pamlenyi, Saint Paul, Minn.

[73] Assignee: Chesley F. Carlson Co., Minneapolis, Minn.

[22] Filed: Sept. 10, 1971

[21] Appl. No.: 179,441

Related U.S. Application Data

[63] Continuation-in-part of Ser. No. 55,049, July 15, 1970, Pat. No. 3,672,767.

[52] U.S. Cl. .............................................. 235/64.7
[51] Int. Cl. .............................................. G06c 3/00
[58] Field of Search ...................... 235/64.7, 61 GM, 235/61 A; 355/68, 69

[56] References Cited
UNITED STATES PATENTS

| | | | |
|---|---|---|---|
| 3,542,470 | 11/1970 | Ost....................... | 355/68 |
| 3,611,159 | 10/1971 | Florsheim, Jr. ....... | 355/69 |
| 3,619,055 | 11/1971 | Archer et al........... | 355/69 |

*Primary Examiner*—Richard B. Wilkinson
*Assistant Examiner*—U. Weldon
*Attorney*—Frederick E. Lange, Jon F. Tuttle et al.

[57] ABSTRACT

Apparatus which receives standard measurable values of density utilized in continuous tone and halftone photographic processes and which can automatically calculate and enter additional compensating values of density. The apparatus is designed for use with a photo process timer which controls main, highlight and flash exposure times of lamps which are conventionally used in the continuous tone and halftone photographic processes. Dials which have indicia thereon calibrated to indicate standard values of density are provided which can be connected to variable resistors and capacitors located in the photo process timer. Manipulation of the density dials preselects resistance and capacitance values to control the potential to which capacitors are charged. The present invention is then utilized to transfer density values so entered on the dials to an additional flash density dial which provides flash exposure to compensate for any screen range which is less than the density range of the copy being reproduced. Also disclosed are variable indicators which can be utilized to calibrate an alternative set point which has the effect of extending the screen range beyond that which can normally be handled with an apparatus of this type and therefore allow a greater flexibility and range of use of the overall photographic system.

15 Claims, 6 Drawing Figures

Patented July 3, 1973

INVENTOR.
George Pamlenyi

BY
Jon F. Tuttle

ATTORNEY

INVENTOR.
George Pamlenyi
BY
Jon F. Tuttle
ATTORNEY

Patented July 3, 1973

INVENTOR.
George Pamlenyi
BY
Jon F. Tuttle
ATTORNEY

DENSITY CALCULATOR

This is a continuation-in-part of application, Ser. No. 55,049, filed July 15, 1970, now U.S. Pat. No. 3,672,767.

BACKGROUND OF THE INVENTION

This invention is designed for use with apparatus for controlling the exposure times of flash lamps which are conventionally utilized in cooperation with main and highlight lamps in continuous tone and halftone photographic processes. It has become increasingly important in the photographic arts to be able to produce high quality work at a high rate of production. To meet this need, the industry is moving to automation and electronic circuitry to provide the speed necessary for high production. While various circuits have been advanced utilizing an RC timing circuit to energize and deenergize the various lamps in continuous tone and halftone photographic processes, the circuit which is the subject of copending application, Ser. No. 55,049, provides a simple noncomplex circuit which is highly accurate in reproducing successive work of the same high quality. Increased facility of operation is also possible in that the circuits described enable variation of both time units (seconds), linearly variable, or relative illumination (density), logrithmically variable.

When using apparatus of this nature from the past, the operator usually works with five parameters, shadow density, highlight density, screen range, copy range, and excess density. The first three of these parameters are measurable by conventional instruments. The values of the other two parameters, copy range and excess density, are conventionally obtained by hand calculation based on standard formulas with the inherent error and time delay associated with hand calculation.

Initially, the proper time unit values are derived. Proper values are dependent on the film, chemistry, and halftone screen being used as well as the personal preference of the operator as to the dot size preferred along the gray scale. Normally sufficient is utilization of only the main and flash circuitry. The main exposure time is based on the dot size the photographer prefers for the highlight portion of the original and the flash time units are set to give the photographer the shadow dot size he prefers. The highlight circuitry and hence the highlight time unit values are utilized to modify the normal procedure. Both the highlight and shadow dot size remain the same while the highlight circuitry controls the placement of the 50 percent halftone dot and consequently the middletones. This technique is known in the art as the "no-screen bump."

After the proper time unit values are derived for a particular film, chemistry and halftone screen no further time unit calibration is necessary. Thereafter, the same time unit settings are maintained and only density differences, depending on the respective densities of the piece of work to be reproduced, are varied.

Density variations are as follows. If the normal procedure is to be used, the measured highlight density value is set on the main density dials. A calculated value for excess density is then set on the flash density dial. Excess density is the difference between the copy density range and the halftone screen range. The copy density range is the difference, as measured on the original to be used, between the main dot size (highlight density) and the shadow dot size (shadow density).

If the no-screen bump technique is to be utilized, density adjustments are initially obtained by trail and error. A suggested starting point is to subtract 0.3 density from the main exposure (thereby cutting the main exposure time in half) and adding 0.06 density prior to initiating the highlight exposure time.

SUMMARY OF THE INVENTION

The present invention includes a mechanical computer which allows measured density readings to be fed into its dials and automatically calculates and enters additional compensating values of density. This computer is based on the principle of the slide rule and calculates and enters automatically the value of excess density upon entering the values of shadow density, highlight density and halftone screen range into the computer dials. To accomplish this, a cam and cam follower as well as gearing is provided to mechanically calculate unknown parameters according to standard photographic formulas. These values can then be used to calibrate a photo process timer. The density calculator is designed so that it may be connected directly to a photo process timer and, during the process of calculation, make the necessary adjustments to the photo process timer so that operator error is eliminated.

A further modification includes variable indicators rotatably attached to the density dials. By calibrating the linearly variable time units to the reference established by said variable indicators the standard photographic techniques which are normally utilized in processes to which the present invention is directed are greatly expanded and improved. Since the variable indicators can be used basically to expand the screen range of the screen being utilized, the variable indicators provide superior techniques to obtain screen positive processes, duo tones, flat copy, direct screen negatives, etc.

DESCRIPTION OF THE PREFERRED EMBODIMENT

Figure 1:
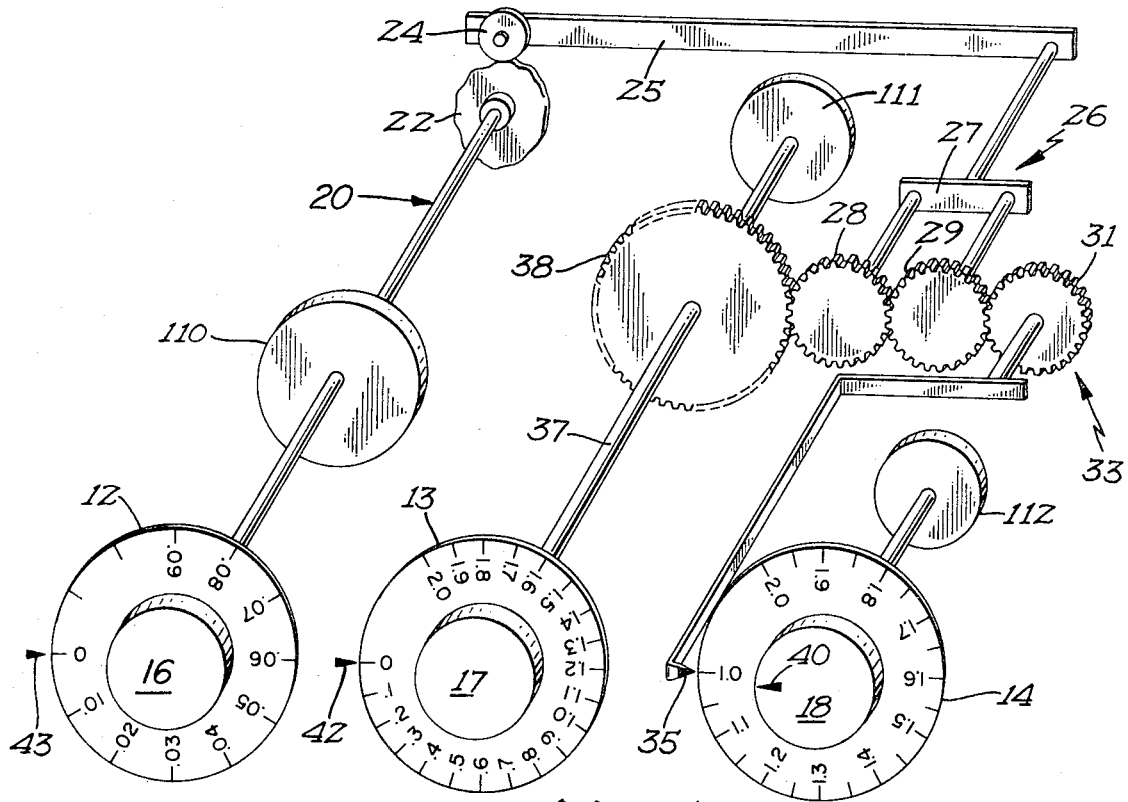
FIG. 1 is a schematic diagram of the mechanical density computer used to calculate and enter excess density.
Figure 2:
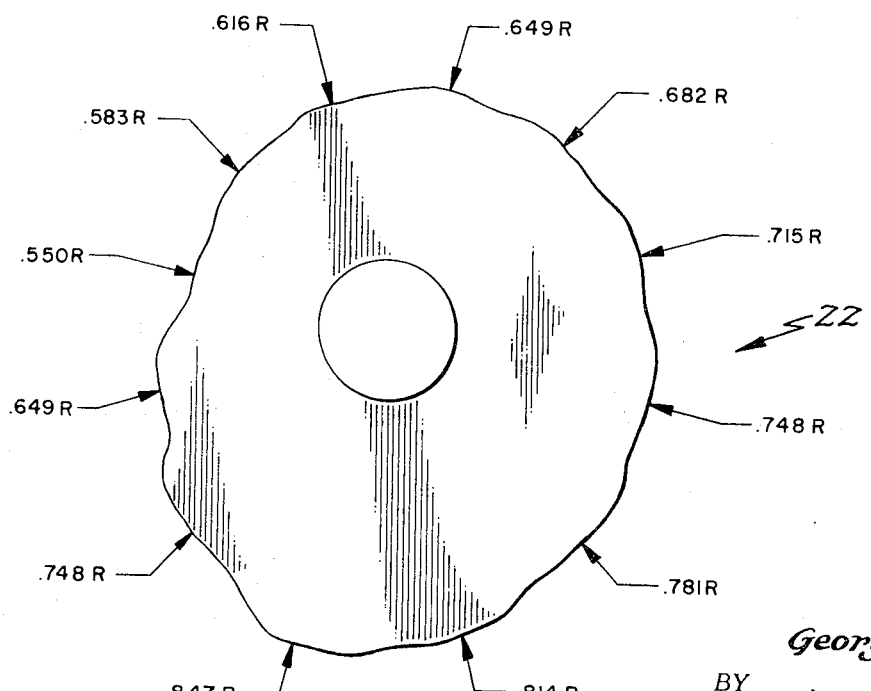
FIG. 2 is the cam utilized in my computer to obtain the values desired.

A general understanding of the density computer may be generally gained with reference to FIGS. 1 and 2. The computer is used to compute and enter data necessary for photographic processes. For example, the value of excess density (De) is presently computed by hand utilizing the following equations.

$$Dc = Ds - (0.1Dh + 0.01Dh)$$

$$De = Dc - Dsc$$

Where
 Ds = shadow density
 Dh = highlight density
 Dc = copy range
 Dsc = screen range
 De = excess density In the embodiment shown by schematic in FIG. 1, three dials, 12, 13, 14 are employed each with a control knob 16, 17, 18 which is rotatably fixed to the respective dials 12, 13, 14. In actual construction dials 12 and 13 can be made coaxial but for ease of discussion and explanation they have been disclosed as separate dials. As is shown in FIG. 1 each of the dials 12, 13, 14 have indicia on the outer edge thereof. The indicia on dial 12 corresponds to 0.01 density values, the indicia on dial 13 corresponds to 0.1 density values, and the indicia on dial 14 corresponds to flash density values.

Rotatably connected by shaft 20 to control knob 16 is a cam 22. The cam 22, shown in detail in FIG. 2, is constructed so that radial movement of the cam follower 24 is transmitted through lever 25 and shaft assembly 26 to cant gears 28 and 29. The tangential movement of gear 29 relative to gear 31 rotates gear 31 and this rotation is transmitted through shaft assembly 33 to pointer 35. As is obvious from FIG. 1, rotational movement of control knob 17 and dial 13 is transmitted through shaft 37, gear 38, gears 28, 29, and 31, and shaft assembly 33 to move pointer 35. In this manner the summation of Dh indicated in the formula above is accomplished as movement of dial 12, cam 22, cam follower 24, lever 25, shaft assembly 26, gears 28 and 29, gear 31, and shaft assembly 33, is only one-tenth as effective to move pointer 35 as rotation of dial 13 and associated gearing.

Figure 4:
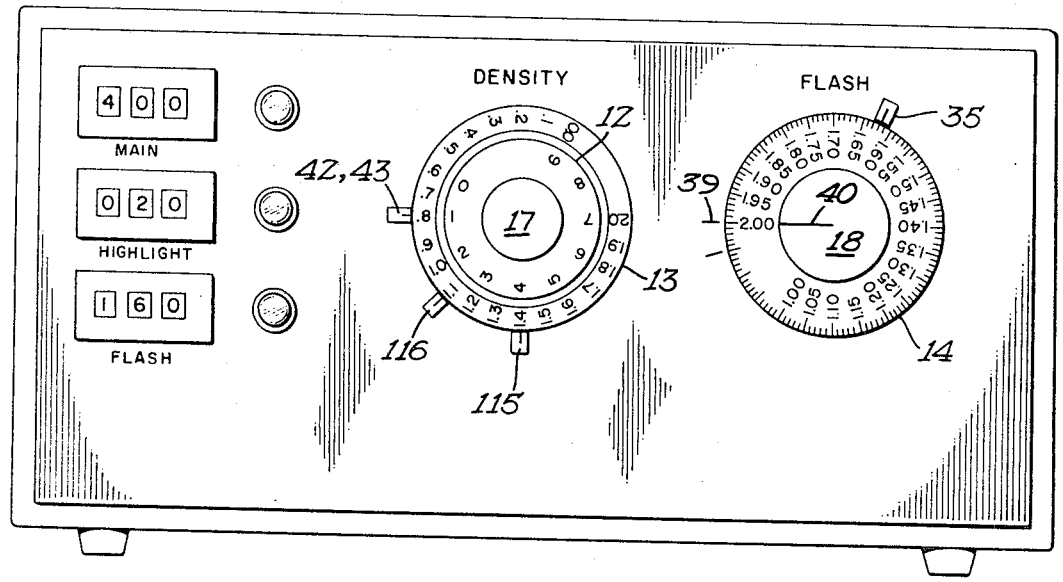
FIG. 4 is the outer housing of a photo process timer showing positioning of the variable indicators when used in duo tone techniques.
Figure 5:
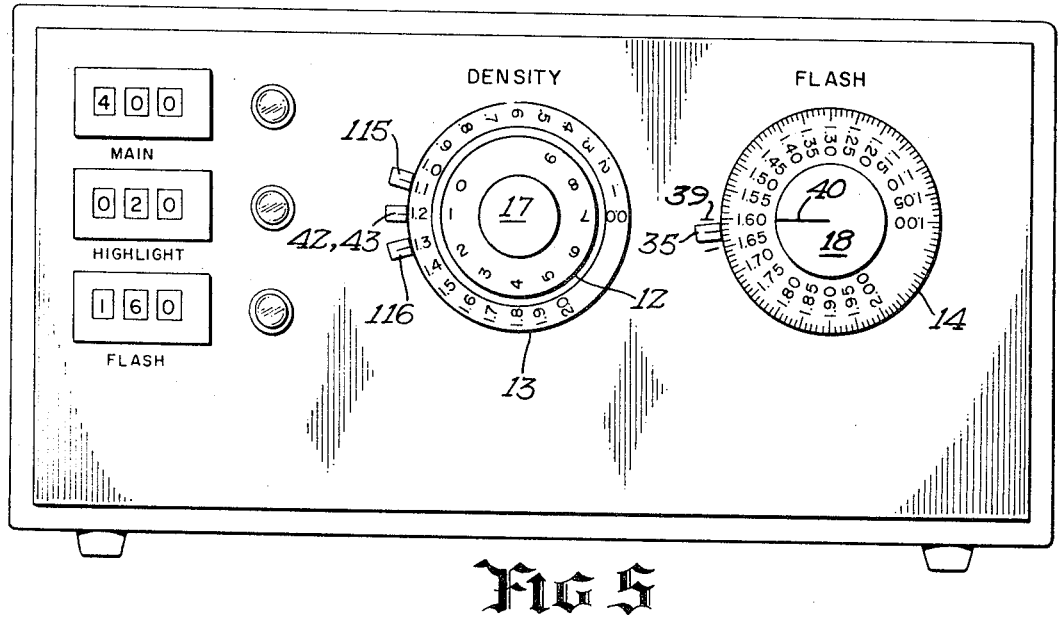
FIG. 5 shows the same view as FIG. 4 except that the variable indicators are positioned for flat copy techniques.

The cam 22 dimensions as shown in FIG. 2 are suitable for use when dial 16 is coaxial with dial 17 as shown in FIGS. 4 and 5. With this arrangement levers 25 and 27 are of equal length. It should be obvious, however, that lever 25 can be of any length as long as proportionate changes are made in the cam 22 dimensions. The teeth ratio between gear 38 and gear 28 should be 2:1 with a sufficient number of teeth to enable fine adjustments. Utilizing a 120 tooth gear for the large gear 38 and a 60 tooth gear for the smaller gears 28, 29, and 31 has been found satisfactory. Therefore, full revolution of control knob 16 effectuates only partial circumferential movement of the pointer 35 relative to the dial 14, being equivalent a density variation of 0.1 as indicated on either dial. A full revolution of control knob 17, however, effectuates two full revolutions, or the equivalent of 2.0 density units, of the circumferential pointer 35 due to the 2:1 tooth ratio between gear 38 and the gear train 28, 29, and 31.

Operation of the mechanical computer is as follows. Referring again to FIG. 1, the value of Dsc is set between pointer 35 and pointer 40 on control knob 18. There is a slip clutch (not shown) between the knob 18 and dial 14 for this purpose. Control knob 17 is rotated until proper value of 0.1Dh appears opposite the pointer 42 associated with dial 13. This transmits the value of 0.1Dh to pointer 35. Control knob 16 is then rotated until the value of 0.01Dh appears opposite the pointer 43 associated with dial 12. This transmits the value of 0.01Dh to pointer 35. The addition of 0.1Dh and 0.01Dh has taken place because of the 1:10 relationship of the relative movement of the dials 16 and 17. Control knob 18 is then rotated, as well as associated dial 14, so that the value of Ds is opposite pointer 35. With the rotation of control knob 18, the value of De has been calculated, that value being the difference between Ds and (Dsc + 0.1Dh + 0.01Dh). It should be understood that at the completion of the operation of the computer the pointers continuously display the quantities Ds, Dh and Dsc and the value of De is easily obtained by noting the relative movement of dial 14.

It should be also noted that the mechanical computer is constructed so as to be compatible with the invention which has been disclosed and claimed in my copending application, Ser. No. 55,049 filed July 15, 1970, entitled Photo Process Timer. A simplified circuit diagram of that invention is shown in FIG. 3.

Figure 3:
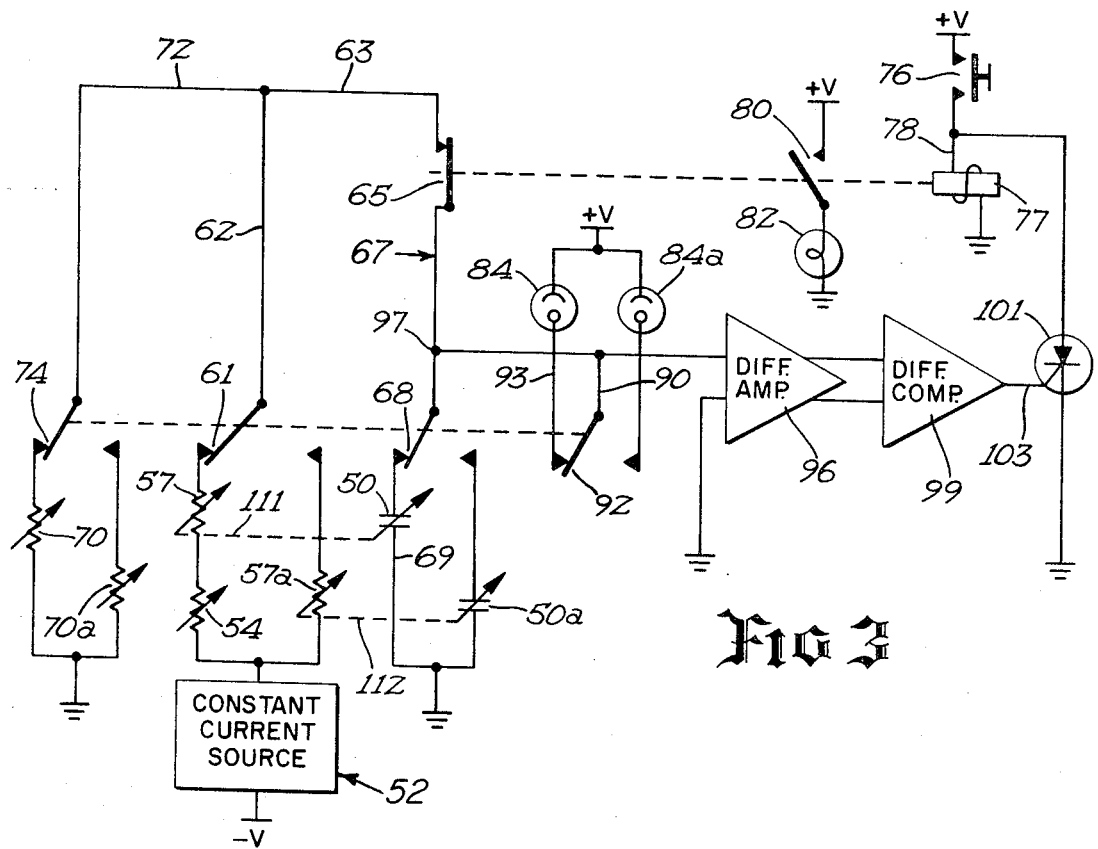
FIG. 3 is a schematic diagram showing basic elements of a timing circuit with which my invention may be utilized.

Referring to FIG. 3, a variable capacitor 50 is charged from a constant current source 52 through a variable resistor 54, variable resistor 57, switch contact 61, conductor 62, conductor 63, relay switch 65, conductor 67, switch 68, variable capacitor 50, conductor 69, to ground. The voltage to which the capacitor is charged depends on the magnitude of the variable resistors 54, 57 and variable capacitor 50 referred to as the density control, as well as variable resistor 70 which is connected across the capacitor 50 through conductor 72, switch contact 74, resistor 70 to ground. One set of controls, comprising resistor 54, resistor 57, and capacitor 50, is utilized to control the exposure time for the main and highlight lamps. These devices have been designed to yield logarithmic variations in current, and thus potential on the capacitor 50, for uniform adjustments of the density dials. Resistor 57 and capacitor 50 respond to the 0.1 density values and resistor 54 responds to the 0.01 density values. The second set indicated, comprising resistor 57a and capacitor 50a, are utilized for the flash lamp exposure time. Similarly, resistor 57a and capacitor 50a respond to the flash density values. Resistors 70 and 70a connected in parallel with the capacitors 50 and 50a, are linearly variable and respond to changes in time unit values.

After the capacitor 50 has been charged to the proper value, the timing cycle is initiated by depressing the start button 76 which energizes a relay 77 from a positive source of voltage through start switch 76, conductor 78, relay 77, to ground. When energized, normally closed relay switch 65 opens to disconnect the charging circuit and relay switch 80 closes to energize the lamps 82. Prior to the light 82 being energized the capacitor 57 does not discharge in that phototube 84 prevents any discharge from occurring. When the light 82 is energized the phototube 84 conducts and the negative charge on the capacitor 50 is discharged from the capacitor 50 through switch 68, conductor 89, conductor 90, switch 92, conductor 93, phototube 84, to the positive source of voltage indicated.

Monitoring the discharge of the capacitor 50 is a differential amplifier 96 connected from point 97 through conductor 89 to the input of the differential amplifier. The discharge of the timing capacitor 50 is monitored by the differential amplifier 96 and a differential comparator 99 to determine when the capacitor 50 has discharged to a small predetermined value. When that small potential has been reached the output of the differential comparator 99 increases to a relatively large positive output within nanoseconds. This output is applied to the gate of a silicon controlled rectifier 101 through conductor 103, which, when it conducts, discharges the relay 77 which controls the lighting circuit 82. When the relay 77 is deenergized its switch 80 accomplishes deenergization of the lamp 82 being utilized and thus ends the timing cycle for that lamp 82. Relay switch 65 returns to its normally closed position as well and the circuit may be utilized for the next timing cycle. As noted above, a more complete discussion of the circuitry may be obtained from my copending application Ser. No. 55,049.

By connecting the density computer control knob 16 to variable resistor 54, control knob 17 to variable resistor 57 and variable capacitor 50 and control knob 18 to variable resistor 57a and capacitor 50a, shown as rotary switches 110, 111 and 112 in FIG. 1, the manipulation of the dials 12, 13, 14 and associated control knobs 16, 17, 18, discussed above, automatically adjusts rotary switch 112 so that the value of excess density is entered into the switch 112 with no calculations being performed. In other words, simply by setting the values of highlight density, shadow density and screen range into the computer the value of excess density is not only calculated but is also entered automatically into a photo process timer as disclosed and discussed above.

As shown in FIGS. 4 and 5 a further modification of this invention employs the use of variable indicators 115 and 116 which may be utilized to vary and increase the possible photographic techniques which may be employed with the present invention. For example, there are times when the density range of copy is less than the density range of the screen. This requires change of the basic screen range for the short range copy. This is a copy condition where the highlights are dark and the shadows are much lighter than normal which frequently exists with Polaroid pictures and with wire photos, as well as those pictures which may have been taken on a very overcast day.

Using the variable indicators 115, 116 for shooting flat copy and very flat copy, the setting of density is greatly simplified and in fact is almost identical to exposing normal contrast copies. Exposing flat copy requires the employment of the no-screen bump exposure mentioned above in order to shorten the basic screen range. When establishing a no-screen bump procedure the main exposure will be shortened and a no-screen bump added to obtain the same size standard, normal highlight dot size as established as a standard when using a main exposure only. This is accomplished as shown in FIG. 4 by positioning the variable indicators 115, 116 a distance of 0.3 density and 0.6 density from the fixed reference pointer 42, 43. As discussed above the standard technique for the no-screen bump procedure is to manually subtract 0.3 density from the main exposure and add density to the highlight exposure time.

With the variable indicators 115, 116, however, the highlight density value obtained by measurement is positioned relative to the variable indicators 115 or 116 and the highlight time units 70 are modified until the normal highlight dot is obtained. Once the highlight time unit setting has been established it then remains constant for this exposure control technique.

When copy contrast is within 0.30 less than the basic screen range when using a main exposure only, the first variable indicator 115 is utilized. For example, if a total highlight density setting of 0.11 is desired, 0.10 is set with the outer density dial 13 opposite the variable indicator 115 and 0.01 on the inner density dial 12 set opposite the fixed pointers 42, 43. Thereafter, the technique is the same as in standard operations. For example, if the shadow density were 1.62 it would be set opposite the movable flash pointer 35 as shown in FIG. 4.

When exposing very flat copy such as when the copy contrast is more than 0.30 less than the basic screen range, the same technique is employed except the highlight density is set opposite the second variable indicator 116. Again since utilizing the variable indicators 115 or 116 reduces the main exposure it will require a longer no-screen bump exposure in order to achieve the proper highlight dot size. Therefore, when the second variable indicator 116 is being utilized the highlight time unit 70 will be increased on the order of approximately three to one.

It should also be noted that the above described halftone techniques could be employed when shooting copy with normal contrast whenever it is desired to modify the position of the 50 percent dot relative to the highlight dot. In other words when a no-screen bump exposure is employed the main exposure is shortened. Because of this the 50 percent dot will move closer to the highlight dot on the gray scale and provide a halftone with greater contrast. Using the first technique as described above, utilizing the first variable indicator 115, would move the 50 percent dot approximately 0.15 density closer to the normal highlight position. Using the second technique as described above, using the second variable indicator 116, would move the 50 percent dot approximately 0.30 density closer to the highlight dot and with the end product being a halftone with dramatic highlight to middle tone contrast.

The variable indicators 115, 116 can be utilized for many other techniques such as duo tone exposure systems. When shooting duo tones for various color combinations two basic factors are taken into consideration: the size of the highlight dot, if it is to be more open or tighter than normal, and the size of the shadow dot. FIG. 5 illustrates a simple density dial set up to expose one color printer having a tighter highlight than normal and the second color printer having a more open highlight dot than normal. As shown in FIG. 5 where the variable indicators 115, 116 are set 0.10 density away from the fixed reference points 42, 43 a highlight density setting of 0.11 set relative to the first variable indicator 115 would provide a negative with a more open than normal highlight dot and a density setting of 0.11 relative to the second variable indicator 116 would provide a tighter than normal highlight dot.

If the duo tones require no more than a normal shadow dot the shadow density need merely be set as closely as possible to the movable flash pointer 35 after setting the density dial in order to compute an exposure for a normal shadow dot. It it is required that the shadow dot be larger or smaller than normal, trial and error should be employed to determine the proper time unit setting required in order to implement the desired change in shadow dot size.

From the above it should be obvious that using the variable indicators 115, 116 in conjunction with the computer greatly expedites techniques which can be utilized in halftone and continuous tone photographic processes. Other techniques which are facilitated in a manner similar to those discussed above would be black on black duo tone exposures, density compensation for reproduction ratio shift, color separation techniques, and screen positive techniques, among others.

Figure 6:
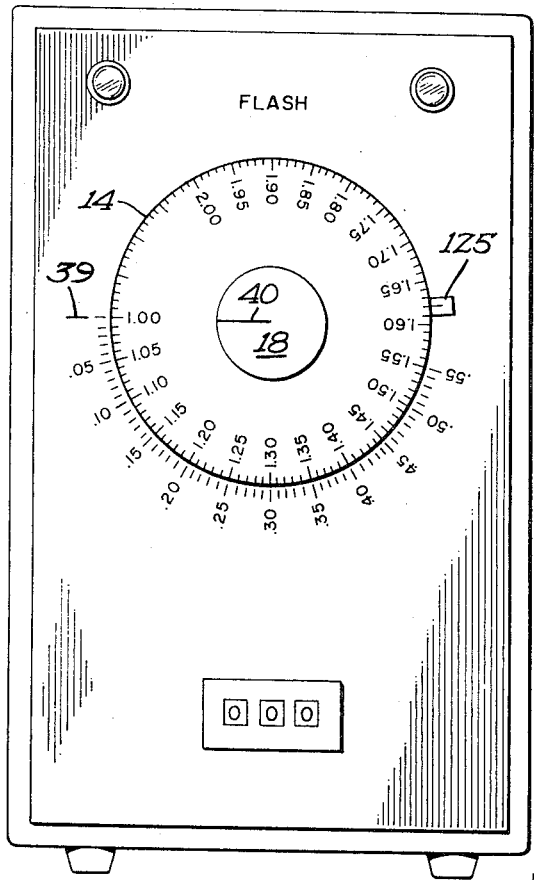
FIG. 6 shows a modular unit utilizing a direct relationship between highlight and shadow density as well as a variable indicator to indicate the value of excess density.

FIG. 6 shows a further modification of the use of a variable indicator in continuous tone and halftone processes. The apparatus shown in FIG. 6 is a modular unit 120 which does not contain a mechanical density computer. The internal circuitry in the modular unit shown in FIG. 6 are the resistor 51a and capacitor 50a and rotary switch 112 associated with the flash exposure circuitry as shown in FIGS. 1 and 3. As in the apparatus shown in FIG. 1 a slip clutch (not shown) is provided between the control knob 18 and the movable dial 14. Circumferentially inscribed around the dial on the surface of the modular unit are highlight density units. As in FIG. 1 the shadow density units are inscribed on the movable dial 14. A fixed reference pointer 40 is provided as well as a variable indicator 125. This variable indicator 125 is utilized to calculate and indicate excess density which can then be utilized in the further operations and calculations for more advanced halftone photographic processes.

The procedure to be utilized is as follows. The index line 40 subscribed on the control knob 14 is referenced to the fixed reference point 39 subscribed on the housing surface of the modular unit as shown in FIG. 6. Utilizing the slip clutch, screen range is referenced between the reference point 39 and index line 40. The variable indicator 125 is then rotated until it is adjacent to a setting of 1.00 on the shadow density dial 14. If known, copy range can be referenced adjacent the reference point 39. Alternatively, the control knob 18 can be rotated until measured shadow density, as indicated on the shadow density dial 14, is aligned adjacent the measured highlight density subscribed on the housing surface of the modular unit. Copy range Dc will then appear next to the reference point 39. In either event, the dial has thus moved an amount equivalent to the difference between copy range and screen range which from the formula given earlier yields excess density. Since the variable indicator was positioned to 1.0 prior to the subtraction the amount of rotation has been indicated relative to the movable pointer 125 and the movable pointer 125 now indicates excess density.

While I have generally described my invention it should be obvious and should be understood that it is for purposes of illustration only and that the various modifications can be made within the scope of my invention.

I claim as my invention:

1. Apparatus for automatically calculating values of density used in continuous tone and halftone photographic processes, comprising:
    a plurality of control knobs;
    dials operatively attached to said control knobs with indicia in units of density subscribed thereon;
    a plurality of input shafts secured to said control knobs;
    a pointer circumferentially located relative to one of said control knobs and associated dials for indicating the value of excess density resulting from manipulation of the other of said control knobs and associated dials; and
    gear means rotatably linking said input shafts for translating density information fed into the control knobs to said pointer.

2. Apparatus of claim 1 wherein said gear means comprise a gear train of four gears in rotational arrangement and wherein said pointer is attached to an offset lever assembly attached to the center of the last gear in said gear train whereby rotational movement of said gear is translated into circumferential movement of said pointer relative to its associated dial.

3. Apparatus of claim 2 wherein the teeth ratio between the first gear in said gear train to the other gears is directly proportional to ratio of the indicia in units of density subscribed on said dials.

4. Apparatus of claim 2 wherein the first gear in said gear train has twice as many teeth as the other gears whereby one revolution of said first gear will produce a double revolution of said pointer relative to its associated dial.

5. The apparatus of claim 1 further comprising:
    a cam fixedly secured to one of said input shafts;
    a cam follower operatively connected with said cam for movement in response to the rotational movement of said cam;
    a lever fixedly secured to said cam follower; and
    a shaft assembly fixedly secured to said level operatively positioned relative to said gear means for translating the rotational movement of said cam to said pointer.

6. Apparatus of claim 5 wherein said gear means comprise a gear train of at least three gears, two of said gears being attached to said shaft assembly and one of said gears being attached to said pointer whereby a vertical movement of said lever produces a twisting or canting of the gears attached thereto which creates rotational movement of the third gear to produce a circumferential movement of said pointer.

7. Apparatus of claim 6 wherein said dials are subscribed in units of density ranging from 0.00 to 0.10 and from 1.0 to 2.0 and wherein said cam and cam follower are attached to the input shaft of the dial subscribed from 0.0 to 0.1 so that a full rotation of that dial produces only a 0.1 movement of said pointer relative to dial subscribed from 1.0 to 2.0.

8. Apparatus of claim 6 wherein vertical movement of said lever, shaft assembly, and associated gears creates a circumferential movement of said pointer which is directly proportional to ratio of the indicia in units of density subscribed on said dials.

9. Apparatus of claim 6 wherein said gear means further comprises a fourth gear engaged with said gear train and attached to one of said input shafts with associated dial and control knob so that circumferential movement of said pointer can be obtained from either the input shaft connected to said fourth gear or the input shaft connected to said cam.

10. Apparatus of claim 1 further comprising variable indicators rotatably fixed to said dials to be circumferentially movable thereto so that secondary reference points can be established and said apparatus can be calibrated and operated from said secondary reference point.

11. Apparatus for automatically calculating the values of density used in continuous tone and halftone photographic processes, comprising:
    at least one dial with indicia in units of density subscribed thereon;
    a fixed reference point located adjacent said dial to which known values of density can be set; and
    a variable indicator rotatably secured to move circumferentially about said dial which can be utilized to reference a selected parameter to be used as a standard for future operations of said apparatus.

12. Apparatus of claim 11 wherein said variable indicator is attached to a dial subscribed in units of flash or excess density and wherein said indicator can be set to a zero mark to determine the relative movement of said dial and thus indicate the value of excess density.

13. Apparatus of claim 11 further comprising:
a plurality of dials with indicia in units of density subscribed thereon;
connecting means connecting all of said dials for translating rotational movement of any one of said dials to another of said dials; and
a plurality of variable indicators rotatably attached to said dial and circumferentially movable relative thereto so that multiple secondary reference points can be established and said apparatus can be calibrated and operated from any of said multiple reference points.

14. For use with apparatus for determining the elapse of timing cycles utilized in continuous tone and halftone printing an apparatus comprising:
a plurality of density dials which can be rotatably adjusted;
indicia in units of density circumferentially subscribed around the periphery of the density dials;
means for computing excess density from the rotational movement of the density dials; and
means for transmitting the rotational movement of the density dials directly and according to the calculation of excess density to the apparatus for determining the elapse of timing cycles.

15. The apparatus of claim 14 further comprising:
a movable pointer to indicate excess density positioned to move around the circumference of one of the plurality of density dials; and
means for transmitting the rotational movement of the density dials according to the calculation of excess density to the movable pointer whereby excess density is indicated by reference to the indicia subscribed on the density dial relative to the movable pointer.

* * * * *